United States Patent
Culkin

(10) Patent No.: US 10,054,668 B2
(45) Date of Patent: Aug. 21, 2018

(54) PROBABILISTIC SIGNAL, DETECTION, AND TRACK PROCESSING ARCHITECTURE AND SYSTEM

(71) Applicant: SRC, Inc., North Syracuse, NY (US)

(72) Inventor: Daniel R. Culkin, Cazenovia, NY (US)

(73) Assignee: SRC, Inc., North Syracuse, NY (US)

( * ) Notice: Subject to any disclaimer, the term of this patent is extended or adjusted under 35 U.S.C. 154(b) by 378 days.

(21) Appl. No.: 15/055,022

(22) Filed: Feb. 26, 2016

(65) Prior Publication Data

US 2018/0164406 A1 Jun. 14, 2018

Related U.S. Application Data

(60) Provisional application No. 62/120,961, filed on Feb. 26, 2015.

(51) Int. Cl.
*G01S 7/295* (2006.01)
*G01S 13/58* (2006.01)
(Continued)

(52) U.S. Cl.
CPC ........... *G01S 7/295* (2013.01); *G01S 7/04* (2013.01); *G01S 13/582* (2013.01); *G06F 3/147* (2013.01)

(58) Field of Classification Search
CPC .......... G01S 7/295; G01S 13/582; G01S 7/04; G06F 3/147
(Continued)

(56) References Cited

U.S. PATENT DOCUMENTS 3,731,304 A 5/1973 Caspers et al.
5,210,798 A 5/1993 Ekchian et al.
(Continued)

FOREIGN PATENT DOCUMENTS

CN 102023294 4/2011
CN 102298142 12/2011
(Continued)

OTHER PUBLICATIONS

Huang et al. "Track-Before Detect Algorithm Based on Dynamic Programming for Multi-Target Tracking" presented at 2010 IEEE, International Conference on Control and Automation, Xiamen, China, Jun. 9-11, 2010.
(Continued)

*Primary Examiner* — Timothy A Brainard
(74) *Attorney, Agent, or Firm* — Bond Schoeneck & King, PLLC; Blaine Bettinger; George McGuire

(57) ABSTRACT

A radar system and method is provided for increasing the search volume, detection range, and/or update rate of a search radar without requiring an increase of the radar transmit power or antenna aperture size. This is accomplished by using a target response calculation that uses signal energy that is thrown away by conventional systems. A probability of target presence and target behavior ($P_{pb}$) is calculated based on the retained signal energy to thus improve the radar's ability to detect the presence of a target. The invention processes multiple CPIs either coherently or incoherently via the $P_{pb}$ methodology to further improve the radar's detection abilities.

30 Claims, 4 Drawing Sheets

(51) Int. Cl.
*G01S 7/04* (2006.01)
*G06F 3/147* (2006.01)

(58) Field of Classification Search
USPC .......................................................... 342/115
See application file for complete search history.

(56) References Cited

U.S. PATENT DOCUMENTS

| | | |
|---|---|---|
| 6,243,037 B1 | 6/2001 | Pulford et al. |
| 6,700,526 B2 | 3/2004 | Witten |
| 6,888,493 B2 | 5/2005 | Driessen et al. |
| 8,094,060 B2 | 1/2012 | Beard et al. |
| 8,330,647 B2 | 12/2012 | Fox et al. |
| 2012/0139777 A1* | 6/2012 | Hunter ................ G01S 13/5242 342/175 |
| 2013/0009804 A1* | 1/2013 | Valentine ................ G01S 13/66 342/146 |

FOREIGN PATENT DOCUMENTS

| | | |
|---|---|---|
| CN | 102419437 | 4/2012 |
| CN | 102621543 | 8/2012 |
| CN | 102901956 | 1/2013 |
| JP | 2010181272 | 8/2010 |

OTHER PUBLICATIONS

Yi et al. "Multi-target Tracking via Dynamic-Programming Based Track-Before-Detect" presented 2012 IEEE, School of Electronic Engineering, University of Electronic Science and Technology of China.

* cited by examiner

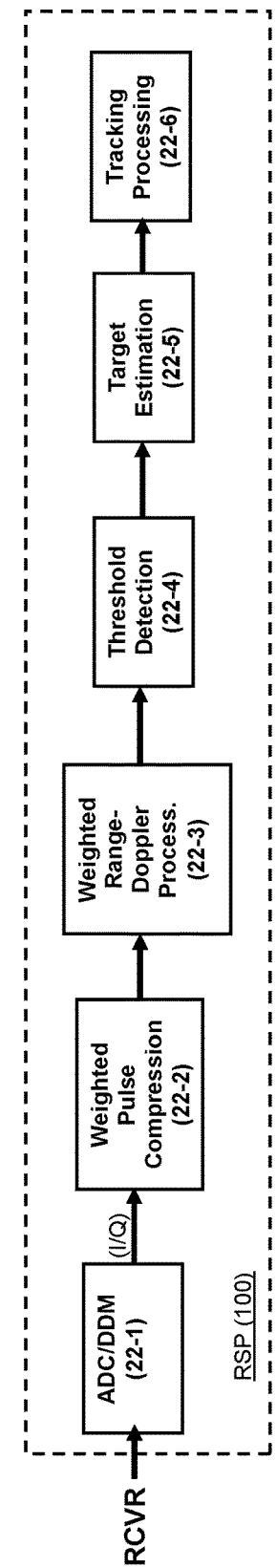
FIG. 2
(Conventional)

PROBABILISTIC SIGNAL, DETECTION, AND TRACK PROCESSING ARCHITECTURE AND SYSTEM

CROSS-REFERENCE TO RELATED APPLICATIONS

This is application claims priority under 35 U.S.C. 119(e) to U.S. Provisional Patent Application Ser. No. 62/120,961 filed on Feb. 26, 2015, the content of which is relied upon and incorporated herein by reference in its entirety, and again, the benefit of priority under 35 U.S.C. 119(e) is hereby claimed.

BACKGROUND OF THE INVENTION

1. Field of the Invention

The present invention relates generally to search radar systems, and particularly to leveraging a probabilistic processing techniques to provide improved capability to search radars without requiring an increase to the system transmit power or aperture size.

2. Technical Background

A radar is a system that uses electromagnetic waves to detect objects within a certain spatial volume. A radar system may be used to determine the range, altitude, direction, and/or speed of fixed objects, or objects that are moving through the spatial volume of interest. Radar systems have been used to identify and/or track various and disparate objects such as aircraft, ships, motor vehicles, weather formations, terrain and baseballs. A radar system transmits radio waves into the spatial volume referred to above. If and when a radio wave comes in contact with an object in space, the radio wave will be reflected and scattered by the object. Thus, a reflected signal is propagated back toward the radar system. The radar system receives the reflected radio wave and detects the object. Of course, a radar system is typically configured to transmit many radio pulses into the spatial volume every second. Each of these pulses are received and detected by the radar system. By comparing these pulses the radar system can determine if the object is moving and if moving, its speed and direction.

Search radar has broad applications in both commercial and government settings to detect ground and/or airborne objects. In reference to FIG. 1, a high level block diagram of a search radar 10 is shown. The search radar 10 includes an antenna assembly 12 coupled to a band pass filter (BPF). The frequency band of the BPF 14 corresponds, of course, to operating frequency of the radar 10. Thus, signals that have frequency components outside the operating frequency band of radar 10 are filtered by the BPF 14. The BPF 14 is connected to a circulator 16. The circulator 16 is configured to direct RF signals from the transmitter 18 to the antenna system 12 so that the antenna 12 radiates the RF transmit signals into the atmosphere. The RF transmitter assembly 18 is configured as a pulse Doppler radar configured to transmit a predetermined modulated pulse in a given PRI. The receiver 20, 22 is configured to listen for reflected return signals during the subsequent PRI listening interval. As those skilled in the art will appreciate, there are a number of PRIs (transmit/receive intervals) that occur over a larger time frame commonly known as a coherent processing interval (CPI).

Accordingly, the circulator 16 is also configured to direct received signals (those captured by antenna system 12) to the RF receiver 20. The return signals are provided to the radar signal processor 14 in the form of complex signals ($Ae^{(j\omega t)}$), where A represents the amplitude and the argument of the exponential includes phase and frequency information. (To be clear, and as shown in FIG. 4, the return signals are digitized, calibrated and pre-processed before radar signal processing occurs).

The RF receiver may typically include a beamformer 200 and a downconverter 202. The beamformer 200 is configured to combine signals obtained from antenna elements of a phased array antenna (12) so that signals at particular angles experience constructive interference while others experience destructive interference. Those skilled in the art will appreciate that beamforming may be carried out in the digital domain by the radar signal processor 100. The downconverter includes a mixer that multiplies the filtered RF signal by local oscillator signal so that the signal is "downconverted" to an intermediate frequency (IF) signal or a baseband signal. The downconverted signal may be further filtered to remove unwanted harmonics. At this point, the downconverted analog signal is provided to the receiver portion of the radar signal processor 22. (Hereinafter, the term radar signal processor 22, 100 will refer to the receiver portion, unless indicated otherwise. A conventional radar signal processor 22 is shown in FIG. 2 whereas the radar signal processor 100 of the present invention is shown at FIG. 3 and described below in the specification).

Turning to FIG. 2, a conventional radar signal processor 22 is depicted. The downconverted received analog signal is directed to an analog-to-digital converter (ADC) 22-1. The ADC 22-1 provides discrete digital samples of the received signal in accordance with a sampling clock. If the analog signal is at some intermediate frequency (IF), then the analog signal may be digitally down converted to provide a digital baseband signal. Each digital baseband signal is directed into a digital Hilbert transformer: as those of ordinary skill in the art will appreciate, the Hilbert transform is employed to shift a given signal by +/−90 degrees. Thus, the output of ADC/DDM 22-1 includes an in-phase component (I) and a quadrature component (Q) for each digital baseband signal sample.

The quadrature baseband signals are subsequently provided to the weighted pulse compression processing block 22-2. The weighted pulse compression processing block 22-2 is configured to multiply the quadrature baseband signals by a weighting function. Specifically, each in-phase and quadrature pair is multiplied with an appropriate complex weighting function $a_k \exp(j\omega_k)$ in order to substantially reduce sidelobe signal energy. (The term $a_k$ is the weight component for the amplitude component of the signal, and $\exp(j\omega_k)$ is the weight component for the frequency and phase component of the signal. Over the course of a CPI, the pulse compression block 22-2 provides a series of weighted digital signals. These signals are calibrated and compressed. (Calibration refers to accurately relating the receive antenna beam-port complex voltages of the radar to the corresponding angular directions of a detected target). One of the drawbacks to this approach is that the weighting process eliminates, or "throws away," signal energy that could otherwise be employed in the target detection process.

The weighted range-Doppler processor 22-3 receives the weighted digital signals and populates a Table in memory. Specifically, the receiver measures the returns from a single pulse during each PRI listening interval and these samples form one row of the Table. This occurs for a sequence of pulses, whose timing is dictated by the PRI length, and the number of which define the coherent processing interval (CPI). Each measured sample from the receiver corresponds to a range sample. (The time axis of collected range samples within each PRI is commonly known as "fast-time"). Each column corresponds to a PRI (the received signals from one pulse, which is typically modulated with a given bandwidth that will be related to the range sample size, and is sometimes referred to as a "chirp") and the Table is fully populated when the last PRI in the CPI is completed. Thus, the time axis for all of the collected chirp signals within each CPI is commonly referred to as "slow-time." Thus, the weighted range-Doppler processor 22-3 populates the Table row by row, with each column representing a received range sample over a sequence of chirps.

After this, the weighted range-Doppler processor 22-3 performs Doppler processing across the rows and columns. Typically, the Doppler processing applies a Fourier Transform (FFT) to each column in order to recover the Doppler (phase/frequency) information from the signals received at a common range. (This data flow is commonly known as a "corner turn" because the data goes in "horizontally" and is then processed vertically, i.e., it "turns the corner"). The weighted range-Doppler processor 22-3 provides a table of values to the threshold detector 22-4.

After this, the weighted range-Doppler processor 22-3 performs Doppler processing across the rows of the column or across PRIs. Typically, the Doppler processing applies a Fourier Transform (FFT) to each row in order to recover the Doppler (phase/frequency) information from the signals. (This data flow is commonly known as a "corner turn" because the data goes in "vertically" and comes out horizontally, i.e., it "turns the corner"). The weighted range-Doppler processor 22-3 provides a table of values to the threshold detector 22-4.

The threshold detector 22-4 evaluates the values in the Range-Doppler table and "detects" a target when a table entry (i.e., a cell) is above a predetermined threshold. In some conventional embodiments, this threshold can be adaptively altered by the relative values of adjacent or nearby cells (in a Constant-False-Alarm-Rate or CFAR configuration, for example), or by time averaging of cell values (in a Clutter Map configuration, for example). In order to minimize the number of detections that are output from the radar due to noise, a detection threshold is typically utilized between 13 dB and 21 dB based on the desired probability of detection and associated probability of false alarm. On a CPI-to-CPI (coherent processing interval) basis, target RCS (radar cross section), noise information, atmospheric effects, environmental effects, the presence of interference sources, and other contributors can introduce fluctuations into the received signal level, resulting in a number of missed detections that can be statistically determined by the other parameters.

The detected target information is provided to the target estimator block 22-5 which may perform monopulse calculations on the range-Doppler tables from multiple beams. (Note that an angular direction of a target with respect to the antenna boresight is typically determined by finding the "monopulse ratio" for the expression $\Delta(\theta)/\Sigma(\theta)$, wherein ($\Sigma$) is the amplitude of the sum beam and ($\Delta$) is the amplitude of the difference beam. The angular direction is, of course, estimated angle ($\theta$) of the target. Once the monopulse ratio is determined, the estimated angle ($\theta$) is typically retrieved from a look-up table in memory.

Once targets are identified and radar tracks established by the radar signal processor 22, the target information can be provided to a display device 24 which can be manipulated by a user via the control interface 26.

Having said all of this, note that a search radar system's performance is generally determined by its range, accuracy, and update rate (how often the search radar scans a given portion of the search volume). For a given update rate, a radar system's detection range and accuracy is often limited by its ability to achieve a threshold signal to noise ratio (SNR) on a given received signal, the SNR being determined by factors such as transmitted energy, antenna properties, and receiver sensitivity. These factors may be improved by increasing the radar system's antenna size or the power transmitted. However, increasing the antenna size or power transmitted of a radar system is costly and such an upgrade is not feasible for many legacy radar systems in use today. Therefore, a need exists in the art for a way to increase the range and accuracy of a search radar system without increasing the system's antenna size or power transmitted.

The conventional approach to search radar detection processing, briefly described above, introduces a significant loss of information from several sources. As noted above, one drawback to the conventional approach relates to the loss of information introduced by the weighting function. (The weighting function is employed to minimize the presence of false detections).

What is needed is a system and a method that effectively increases search radar performance. Accordingly, a need exists in the art for a system and method of minimizing false detections without while minimizing loss of information. Moreover, a need exists for a system and method for determining the presence and behavior of a target using all of the reflected signal energy. What is further needed is a system and a method that can detect targets using information derived from signals having relatively lower energy (than those required by conventional systems and methods), effectively increasing the search radar performance.

SUMMARY OF THE INVENTION

The present invention addresses the needs described above by providing a system and method for reducing the loss of information by replacing the traditional processing techniques with a low loss probabilistic model of target behavior measurement. Using these methods, the presence and behavior of a target can be determined using information derived from a much lower received signal level than from current methods, effectively increasing the search radar performance. Using the probabilistic model of the present invention increases the search volume, detection range, and/or update rate of the sensor without requiring an increase of power-aperture of a radar system or introducing an increase of false detections.

One aspect of the present invention is directed to a radar system that includes an RF receiver configured to convert at least one RF signal obtained from an environment into at least one downconverted analog signal having main lobe signal energy and sidelobe signal energy components, the at least one downconverted analog signal corresponding to at least one digital baseband signal. The system also includes a radar signal processor arrangement that has at least one filter coupled to the RF receiver. The at least one filter is configured to correlate the at least one digital baseband signal with a predetermined filter signal, the at least one filter applying substantially no complex weighting to the at least one digital baseband signal so that unweighted signal samples corresponding to the at least one digital baseband signal are provided. The unweighted signal samples substantially retain signal energy information corresponding to the main lobe signal energy and sidelobe signal energy components. The radar signal processor also includes a range-Doppler processor element configured to extract frequency data from the unweighted signal samples to obtain range-Doppler data, the range-Doppler processor element being further configured to populate a range-Doppler Table with the range-Doppler data. The radar signal processor also includes a target response processor element configured to calculate a target response value for each cell in the range-Doppler Table, each target response value corresponding to a probability of target presence ($P_{pb}$).

In one embodiment, the radar signal processor arrangement is configured as a distributed heterogeneous processing arrangement that includes processing components selected from a group of processing components including application specific integrated circuits (ASICs), field-programmable gate array devices (FPGAs), reduced instruction set computers (RISC), graphics processing units (GPUs), or multi-purpose processor devices.

In one embodiment, the radar signal processor arrangement is configured to convert the at least one downconverted analog signal corresponding to at least one digital baseband signal substantially in accordance with a Nyquist sampling rate.

In one embodiment, the system further comprises: at least one radar display device coupled to the radar signal processor arrangement, the at least one radar display device being configured to represent data corresponding to the probability of target presence ($P_{pb}$) as human-readable indicia; and at least one radar control device coupled to the at least one radar display device and the radar system, the at least one radar control device being configured provide control data or radar search parameters to the radar system.

In one embodiment, the target response value is substantially equal to:

$$\text{Response}(a,b) = \Sigma_{i=1}^{A} \Sigma_{j=1}^{B} M(i,j) I(i,j,a,b),$$

wherein, M corresponds to the range-Doppler table, A×B corresponds to a size of the range-Doppler table (M), a,b represent an ordered pair corresponding to a location in the range-Doppler table, and I corresponds to an Ideal Response Table.

In one version of the embodiment, the target response value corresponds to a signal-to-noise ratio (SNR), a noise portion of the SNR being based on at least the RF receiver.

In one embodiment, the target response value corresponds to a received signal strength representing the signal energy information, the target response processor being configured to evaluate the target response value over a plurality of cells to determine a multi-cell target response pattern, the plurality of cells corresponding to substantially all or a portion of the range-Doppler table.

In one embodiment the system further includes a target probability processing element configured to arrange the target response values in a Target Response Table having a dimensionality substantially corresponding to the range-Doppler Table.

In one version of the embodiment, each target response value in the Target Response Table is converted into a corresponding probability of target presence ($P_{pb}$) to thus populate a Target Probability Table having a dimensionality substantially corresponding to the Target Response Table.

In one version of the embodiment the system further comprises a multi-CPI tracker element configured to compile a plurality of Target Probability Tables over a plurality of coherent processing intervals (CPIs) to form a three-dimensional probability matrix of probability of target presence ($P_{pb}$) values, the three-dimensional probability table having a range axis, a Doppler axis, and a time axis indexed by CPI.

In one version of the embodiment, the multi-CPI tracker is configured to calculate a multi-CPI probability of target presence based on the three-dimensional probability matrix, the multi-CPI probability of target presence being calculated in accordance with a coherent tracker, a non-coherent tracker, a probabilistic multi-model tracker, or a multi-hypothesis tracker.

In one embodiment, the radar signal processor arrangement is further configured to perform a target probability determination, the target probability determination including a converse-Swerling operation, the converse-Swerling operation that converts the target response value into the probability of target presence ($P_{pb}$).

In one version of the embodiment, the target response processor element is configured to covert each cell in the range-Doppler Table into a corresponding target response value to populate a Target Response Table substantially corresponding to the range-Doppler Table.

In one version of the embodiment, the converse-Swerling operation is performed by retrieving the probability of target presence ($P_{pb}$) for each target response value from a look-up table to form a Target Probability Table having a dimensionality substantially corresponding to the range-Doppler Table, the Target Probability Table including probability of target presence ($P_{pb}$) values obtained over one coherent processing interval (CPI).

In one version of the embodiment the system further comprises a multi-CPI probability tracker configured to evaluate target probability trends over a plurality of CPIs by evaluating a plurality of Target Probability Tables obtained over a plurality of CPIs.

In one embodiment, the radar system is characterized by an effective search volume, an effective detection range, or an effective update rate that are functions of the signal energy information.

In another aspect, the invention is directed to a method that includes the steps of: providing a radar system having an RF receiver configured to convert at least one RF signal obtained from an environment into at least one downconverted analog signal having main lobe signal energy and sidelobe signal energy components, the at least one downconverted analog signal corresponding to at least one digital baseband signal; correlating the at least one digital baseband signal with a predetermined filter signal so that substantially no complex weighting is applied to the at least one digital baseband signal to thus provide unweighted signal samples corresponding to the at least one digital baseband signal, the unweighted signal samples substantially retaining signal energy information corresponding to the main lobe signal energy and sidelobe signal energy components, the radar system being characterized by an effective search volume, an effective detection range, or an effective update rate that are functions of the signal energy information; extracting frequency data from the unweighted signal samples to obtain range-Doppler data; populating a range-Doppler Table with the range-Doppler data; and calculating a target response value for each cell in the range-Doppler Table, each target response value corresponding to a probability of target presence ($P_{pb}$).

In one embodiment the method further comprises the step of converting the at least one downconverted analog signal into at least one digital baseband signal in accordance with a Nyquist sampling rate.

In one embodiment the method further comprises the steps of: representing data corresponding to the probability of target presence ($P_{pb}$) as human-readable indicia; and providing control data or radar search parameters to the radar system.

In one embodiment, the target response value is substantially equal to:

$$\text{Response}(a,b) = \Sigma_{i=1}^{A} \Sigma_{j=1}^{B} M(i,j) I(i,j,a,b),$$

wherein, M corresponds to the range-Doppler table, A×B corresponds to a size of the range-Doppler table (M), a,b represent an ordered pair corresponding to a location in the range-Doppler table, and I corresponds to an Ideal Response Table.

In one version of the embodiment, the target response value corresponds to a signal-to-noise ratio (SNR), a noise portion of the SNR being based on at least the RF receiver.

In one embodiment, the target response value corresponds to a received signal strength representing the signal energy information, the target response processor being configured to evaluate the target response value over a plurality of cells to determine a multi-cell target response pattern, the plurality of cells corresponding to substantially all or a portion of the range-Doppler table.

In one embodiment the method further comprises the step of arranging the target response values in a Target Response Table having a dimensionality substantially corresponding to the range-Doppler Table.

In one version of the embodiment, each target response value in the Target Response Table is converted into a corresponding probability of target presence ($P_{pb}$) to thus populate a Target Probability Table having a dimensionality substantially corresponding to the Target Response Table.

In one version of the embodiment the method further comprises the step of compiling a plurality of Target Probability Tables over a plurality of coherent processing intervals (CPIs) to form a three-dimensional probability matrix of probability of target presence ($P_{pb}$) values, the three-dimensional probability table having a range axis, a Doppler axis, and a time axis indexed by CPI.

In one version of the embodiment the method further comprises the step of calculating a multi-CPI probability of target presence based on the three-dimensional probability matrix, the multi-CPI probability of target presence being calculated in accordance with a coherent model, a non-coherent model, a probabilistic multi-model tracker, or a multi-hypothesis tracker.

In one embodiment the method further comprises the step of performing a target probability determination, the target probability determination including a converse-Swerling operation, the converse-Swerling operation that converts the target response value into the probability of target presence ($P_{pb}$).

In one version of the embodiment the method further comprises the step of converting each cell in the range-Doppler Table into a corresponding target response value to populate a Target Response Table substantially corresponding to the range-Doppler Table.

In one version of the embodiment, the converse-Swerling operation is performed by retrieving the probability of target presence ($P_{pb}$) of the corresponding target response value from a look-up table stored in a memory to form a Target Probability Table having a dimensionality substantially corresponding to the range-Doppler Table, the Target Probability Table including probability of target presence ($P_{pb}$) values for one coherent processing interval (CPI).

In one version of the embodiment the method further comprises the step of evaluating target probability trends over a plurality of CPIs by evaluating a plurality of Target Probability Tables obtained over a plurality of CPIs. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is a diagrammatic depiction of a conventional radar signal processor;

DETAILED DESCRIPTION

Figure 1:
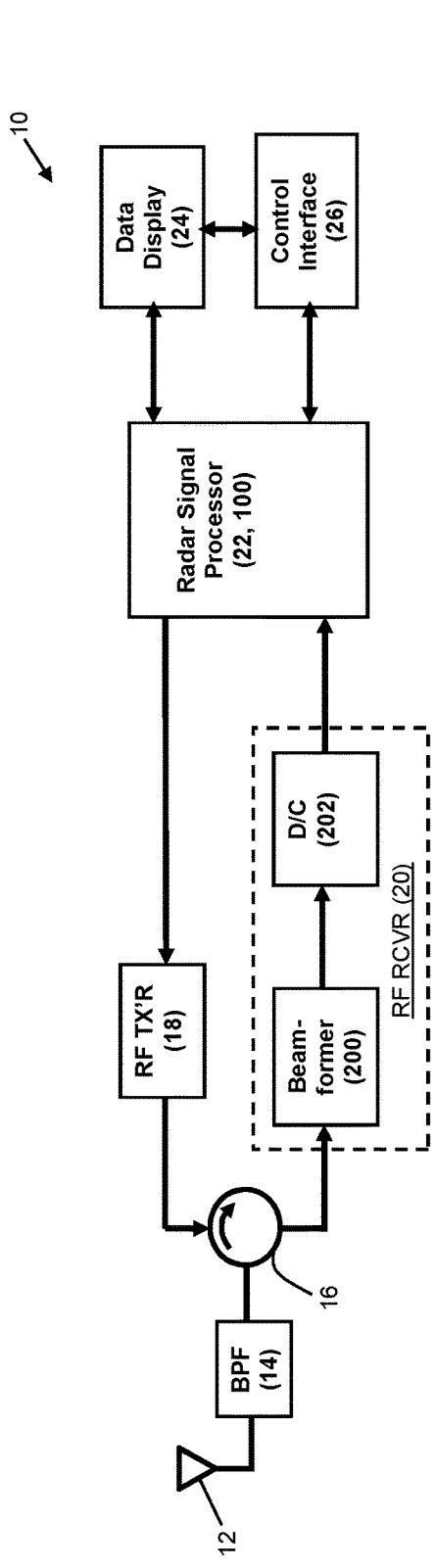
FIG. 1 is a block diagram of a search radar.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the radar system of the present invention is shown in FIG. 1, and is designated generally throughout by reference numeral 10. Moreover, an exemplary embodiment of the radar signal processor of the present invention is shown in FIG. 3, and is designated generally throughout by reference numeral 100.

Referring back to FIG. 1, a high level block diagram of a search radar 10 is shown. The present invention may be employed in a search radar that includes the antenna system 12, BPF 14, circulator 16, the RF transmitter 18 and the RF receiver 20. However, the RSP 22 depicted in FIG. 2, is replaced in the present invention by the radar signal processor depicted in FIG. 3. Moreover, the RSP 100 of the present invention is configured to perform the method shown at FIG. 4 and described herein.

Figure 3:
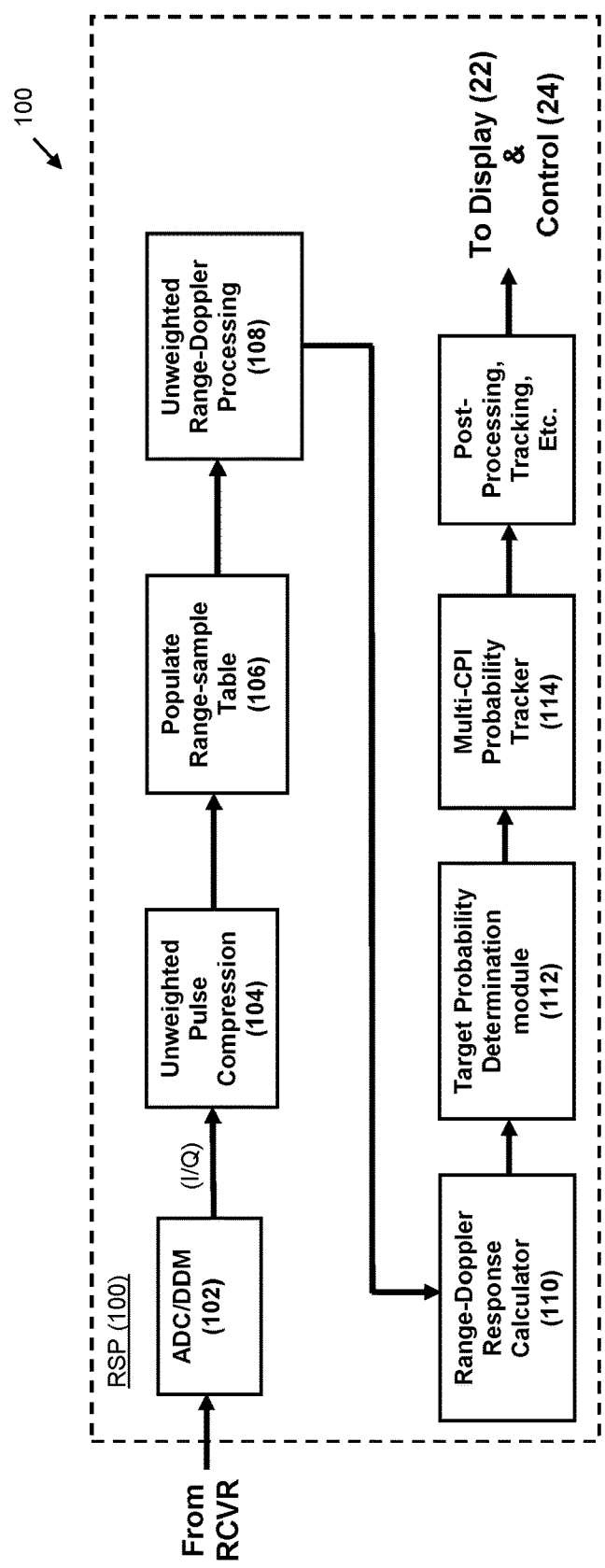
FIG. 3 is a diagrammatic depiction of a radar signal processor in accordance with the present invention.

As embodied herein, and depicted in FIG. 3, a diagrammatic depiction of a radar signal processor 100 in accordance with the present invention is disclosed. As before, the downconverted received analog signal (from the RF receiver shown in FIG. 1) is directed to an analog-to-digital converter (ADC) 102 which provides digital samples of the received signal. Again, if the analog signal is at some intermediate frequency (IF), then the analog signal may be digitally down converted to provide a digital baseband signal. The ADC module 102 directs each digital baseband signal into a digital Hilbert transformer to provide an in-phase component (I) and a quadrature component (Q) for each digital baseband signal sample.

The quadrature baseband signals are subsequently provided to an unweighted pulse compression processing block 104 so that each digital signal counterintuitively includes information corresponding to the sidelobe signal energy. Thus, the present invention counterintuitively retains all of the information corresponding to the signal sidelobes and uses this information during the target detection process. Note that the radar system is characterized, inter alia, by an effective search volume, an effective detection range, and an effective update rate that are functions of the all of the signal energy information retained by the unweighted pulse compression processing block 104.

After pulse compression and calibration, the unweighted and compressed sample values are used to populate a range sample table 106. Each row of the range sample table corresponds to a single PRI listening interval. Taken together, all of the rows and columns comprise information corresponding to an entire CPI.

After this, the unweighted range-Doppler processor 108 performs Doppler processing across the columns (i.e., across PRIs) of the range-Doppler table. In other words, the Doppler processor 108 performs "corner turn" processing on each row of unweighted data to recover the Doppler (phase/frequency) information from these signals.

The resulting data is used to populate a range-Doppler table which is provided to the Response Calculation Module (RCM) 110, which is described in greater detail below. Unlike the conventional approach described in the Background, RCM 110 is configured to assign a probability value to each cell in the range-Doppler table (rather than performing threshold detection).

Once a target probability value for each cell is determined, the radar signal processor 100 is configured to provide the probability to a target estimation block 112 which calculates the probability of the presence of a target. This block may be further configured to perform, for example, a binary determination of the presence of a target based on the probability values calculated by RCM 110 using a probability threshold that is based on predetermined detection criteria.

The target estimation block 112 identifies the angular location of the signal received from each cell of the range-Doppler table, and subsequently provides this data to a multi-CPI target determination block 114. In this block, probable target data is identified, along with corresponding probability data provided by RCM 110, is accumulated over multiple CPIs into a three dimensional matrix for multiple consecutive CPIs so that target range walk or other target kinematic behaviors are accounted for.

Once the multi-CPI target determination block 114 identifies a probable target track, this information is directed to a standard target tracking module 116.

Referring again to FIG. 1 and FIG. 3, the radar signal processor 100 may be implemented using any suitable hardware arrangement. For example, those skilled in the art will appreciate that the various signal processing blocks (102-114) may be implemented by different types of processing hardware for efficiency reasons. Thus, certain processes may be implemented using application specific integrated circuits (ASICs), field-programmable gate array devices (FPGAs), reduced instruction set computers (RISC), graphics processing units (GPUs), or suitable multi-purpose computing devices. Moreover, the various processor types articulated above may be arranged to form a distributed heterogeneous processor in order to maximize both flexibility and performance. The radar signal processor 100 may employ a digital bus or fabric to provide data and signaling communications between elements of RSP 100.

The radar 10 may include various I/O devices that enable operators to input data to the system and analyze output. For example, radar operators and/or decision makers may be provided with a lap top or a desk top PC device wirelessly coupled to the control interface 26 (FIG. 1). Input devices may also include, inter alia, keyboards including alphanumeric and other keys for communicating information and command selections to the control interface 26. Other types of user input devices include cursor controls such as a mice, trackballs, or cursor direction keys for communicating directional information and command selections to control cursor movements on one or more display devices.

With respect to display devices 24, personnel may be provided with output devices such as a cathode ray tube devices (CRT), liquid crystal displays, active matrix displays, or plasma displays for displaying the current raw radar data, radar tracks and other such data. In a combat information center type setting, the display 24 may be configured to allow operators and decision makers to view relevant information as a team. A display of this type could also provide planned position indicator (PPI) display of the current raw radar data, radar tracks, etc.

The radar system 10 may also include one or more external communication interfaces that allows the system to provide remote locations and remote users with real time (or near-real time) radar data, traffic alert messages and traffic analysis. Remote users may be operators, analysts and/or decisions makers who are provided with real-time access, or near-real time access to current raw radar data, tracks, alerts, etc.

The communication interfaces may include hardware network access card(s) and/or driver software necessary for connecting the ground station to the external network fabric. The communications interface may be implemented using any suitable arrangement such as the public switched telephone network (PSTN), a digital subscriber line (DSL) card or modem, an integrated services digital network (ISDN) card, a cable modem, a telephone modem, or any other communication interface that provides a data communication connection to a corresponding type of communication line. The communication interface 18 may also interface a local area network (LAN) or a wide area network (WAN)

using, e.g., Ethernet™ or Asynchronous Transfer Mode (ATM) cards that provide a data communication connections between the remote users 40 and the PC I/O devices 20. Communications interfaces may also provide interconnections between the control interface 26 and the global packet data communication network now commonly referred to as the Internet, or to data equipment operated by a network service provider. Wireless links can also be used. In any such implementation, communication interfaces may be configured to transmit and receive electrical, electromagnetic, or optical signals that carry digital data streams representing various types of information.

The term "computer-readable medium" as used herein refers to any medium that participates in providing data and/or instructions to the processor for execution. Such a medium may take many forms, including but not limited to non-volatile media, volatile media, and transmission media. Non-volatile media include, for example, solid state devices, and optical or magnetic disks. Volatile media include dynamic memory devices. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Transmission media may include coaxial cables, copper wire and fiber optic media. Transmission media can also take the form of acoustic, optical, or electromagnetic waves, such as those generated during radio frequency (RF) and infrared (IR) data communications.

Figure 4:
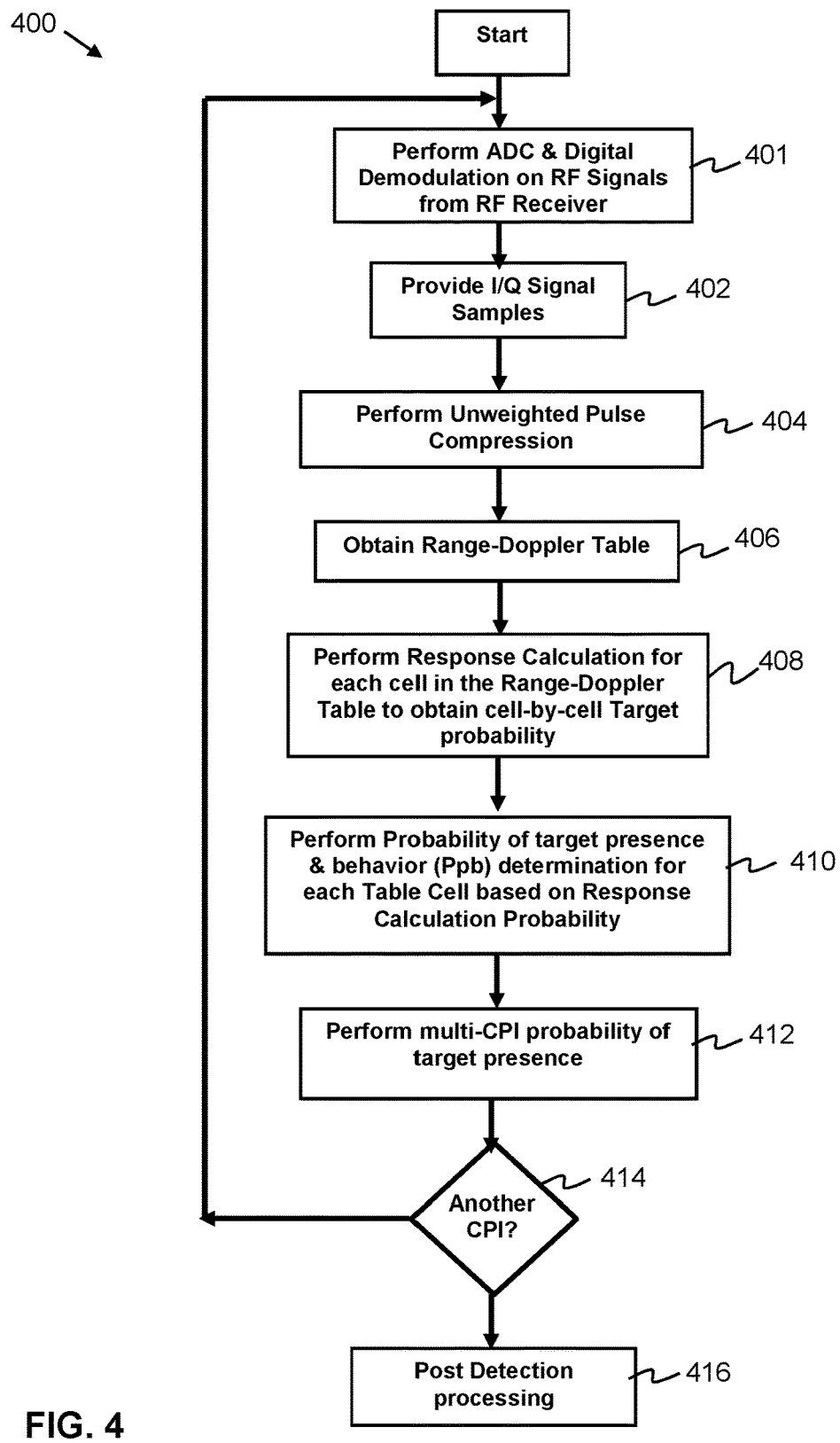
FIG. 4 is a flow chart showing a method for performing probabilistic target detection and tracking in accordance with the present invention.

As embodied herein and depicted in FIG. 4, a flow chart showing a method 400 for performing probabilistic target detection and tracking in accordance with the present invention is disclosed. As noted above, a receive antenna receives an incoming electromagnetic signal from the environment. According to another embodiment, the system processes a signal from a source other than directly from the antenna.

In step 400, therefore, the analog signal is converted to a digital signal at a predetermined sample rate. This process may be performed as described above, or through any other method or system known in the art. The digital information may be stored in a buffer or some other memory bank for later processing or may be sent for immediate processing in real-time. In the alternative embodiment, where the signal received is not directly from an antenna, this step may be skipped in its entirety if the signal is already digitized.

Next, in step 402, the now-digitized signal is converted into in-phase ("I") and quadrature ("Q") samples in the manner described above (using a Hilbert transform filter). A person of ordinary skill in the art will readily recognize that any other filter suitable for transforming the data in IQ samples may be used. According to another embodiment, in an additional step, the IQ samples may also be decimated, downsampling the signal to a sample rate commensurate with the bandwidth of the signal received, or to another predetermined sample rate.

In step 404, The IQ samples are then manipulated again through a matched filter (or pulse compression filter). A matched filter is obtained by correlating the received signal with a known signal to maximize the signal to noise ratio (SNR). As noted above, this step is performed without any complex weighting being applied in order to preserve all available signal energy. Subsequently, the samples are stored into a range sample table as described above. Again, the "fast time" samples represent energy received during one PRI and represent range samples reflected from a transmitted chirp signal. The samples from each PRI are compiled into a two dimensional table having a "fast time" dimension and a "slow time" dimension, as described earlier.

In step 406, the range samples are processed using the "corner turn" processing described above, meaning that the samples of multiple pulses, at a common range, are processed together to extract phasor rotation rates, corresponding to a response associated with Doppler frequency of each received signal from a common range. This process is typically conducted with a Fourier Transform (in which amplitude weighting is applied in order to control sidelobes). In this invention, weighting is typically not applied in order to preserve all available signal energy. The resulting two-dimensional matrix is what is referred to as a "Range-Doppler" table. One of ordinary skill in the art will recognize that that other methods for performing the "corner turn" may be employed, so as long as the requisite "Range-Doppler" table is produced.

A target response calculation is performed in step 408 using complex data from a given Range-Doppler table. The target response calculation represents a pattern recognition of the entire table, or a portion of the table, relative to the cell of interest in a manner that captures the full response of the target in the range-Doppler table. For example, the target response pattern present in the table can be based on a predicted filter response from the pulse compression and from the corner turn processing or other more advanced sampling theory methods.

In one embodiment of the present invention, a matrix of ideal Range-Doppler complex response values for a given set of received signal strengths may be developed, from a-priori knowledge of the pulse compression and corner turn processing being utilized. The matrix of ideal Range-Doppler response values may then be associated with the different cells available in the Range-Doppler table. The process entails each cell in the Range-Doppler table coming under a response test, where the appropriate portions of the correlation matrix are then multiplied with the Range-Doppler table to form a response value (or values). This method enables all energy associated with the detection to be utilized, including the sidelobe energy in both the range and Doppler dimensions, without requiring additional measures to suppress Range and/or Doppler sidelobe detections. For example, one embodiment of the present invention may be implemented as follows:

For a given measured Range-Doppler table M, of size A×B, a response calculation may be performed for a single cell of that table, M (a,b). An ideal response table I, of size A×B (corresponding to the size of M), may be developed, which corresponds to the ideal response associated with a target at a Range-Doppler position M(a,b). The target response can be calculated as:

$$\text{Response}(a, b) = \sum_{i=1}^{A} \sum_{j=1}^{B} M(i, j) I(i, j, a, b)$$

This methodology will minimize loss of received signal information, providing a signal energy advantage when compared with the conventional signal processing methods. When completed for all values of a and b, the resultant Response table can be utilized for downstream processing.

Note that the single CPI response pattern resident in the Range-Doppler table will include energy associated with target response, noise, and interference signals. The presence of uncorrelated noise and interference signals will reduce the visibility of target energy, which in turn will reduce the probability of the presence of a target. However, it should be noted that uncorrelated noise will vary in complex behavior over subsequent CPIs, whereas a target will exhibit persistent, predictable behavior.

In step 410, the response value calculated in Step 408 may be employed to determine the probability of the presence of a target. For a given signal that is received by the radar's receiver, the signal will contain energy from both noise and from the reflected signal from the target. The strength of the noise is determined by numerous factors, which are well understood, as is the strength of the signal reflected from the target (as described by the radar range equation). For most practical targets, the strength of the reflected signal will fluctuate as a function of time, due to the presence of multiple spatially diverse scattering centers on the target, and also because of the motion of the target.

Note that the impact on target detectability is commonly characterized statistically through the use of Swerling Target Models (with signal fluctuation resulting statistically in a signal level loss). In many conventional arrangements (see, e.g., FIG. 2, step 22-4), the ratio of the signal amplitude to the noise amplitude can be used to calculate the probability of detection with an associated probability of false alarm. The resulting information is conventionally used to determine the setting of detection thresholds; by which, a signal-to-noise (SNR) ratio is set based on the resulting probability of detection and probability of false alarm. Note that the present invention does not use the Swerling models in the conventional manner.

Instead, the present invention uses this information conversely; in other words, the converse-Swerling or backwards-Swerling method (for a selected Swerling Model) employed herein uses a SNR value from each Range-Doppler cell to determine or provide the probability of the presence of a target for a given signal level and target type. Note also that the present invention may use different Swerling Models for different target types. Reference is made to "Swerling, Probability of Detection for Fluctuating Targets, Rand Research Memorandum RM-1217, Mar. 17, 1954," which is incorporated herein by reference as though fully set forth in its entirety, for a more detailed explanation of the various Swerling Models. The resulting probability is referred to as the probability of target presence and behavior, or $P_{pb}$, in this embodiment of the present invention.

An example implementation for $P_{pb}$, for which a Swerling I target is assumed and a desired probability of false alarm, can be implemented in various lookup tables. The $P_{pb}$ Reference Table is generated via the Radar Range Equation, the assumed Swerling target model and probability of false alarm, generating a table which contains the resulting probability of detection as a function of SNR. (Reference is made to "Introduction to Radar Systems, Third Edition, Merrill Skolnik, McGraw Hill, Copyright 2001" which is incorporated herein by reference as though fully set forth in its entirety, for a more detailed explanation of, for example, the Radar Range Equation, the assumed Swerling target model and probability of false alarm).

Figures 5A, 5B:
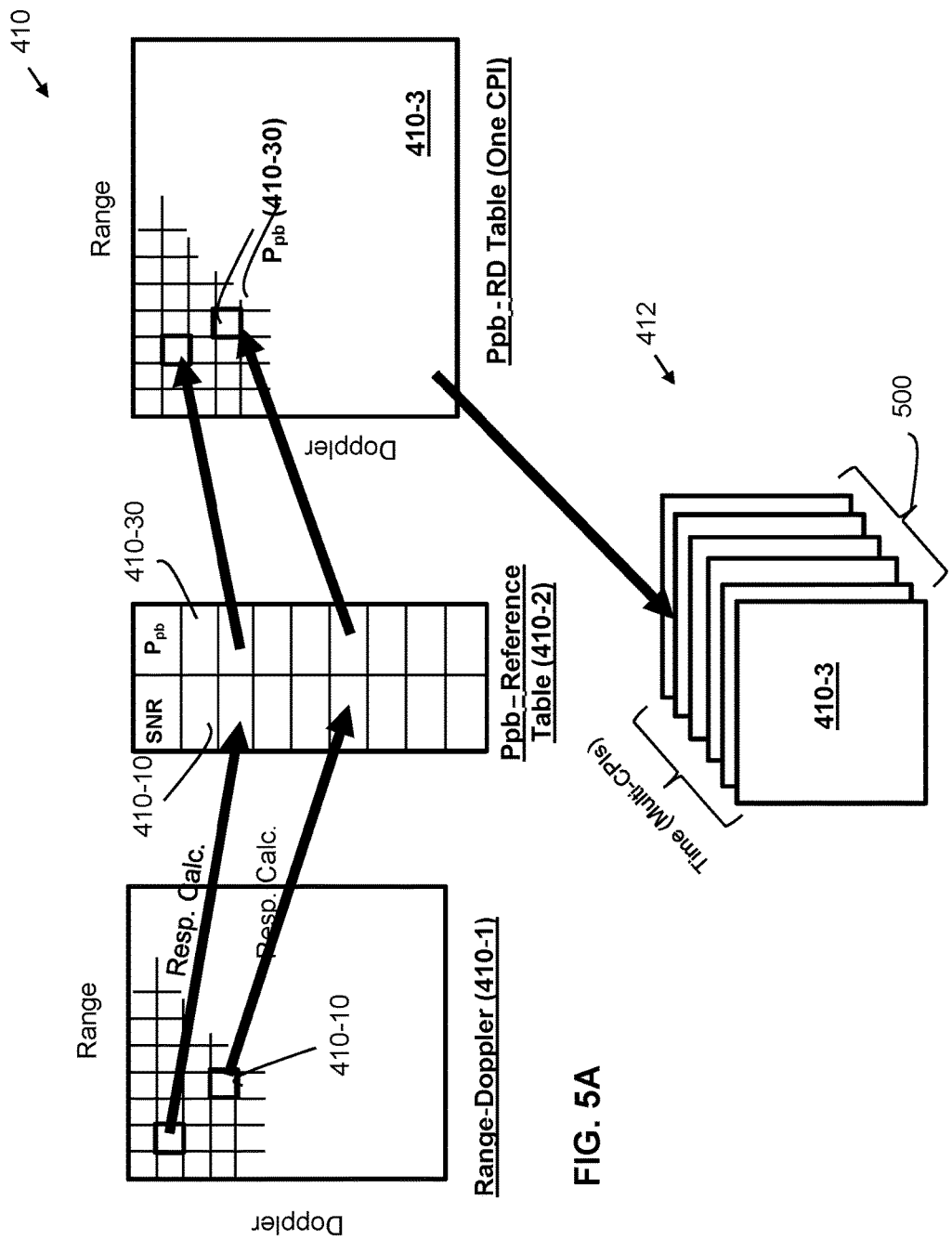
FIG. 5A is a diagrammatic depiction of a method for determining the probability of target presence and behavior ($P_{pb}$) in accordance with the present invention.
FIG. 5B is an illustration of a multi-CPI approach for determining the probability of target presence and behavior ($P_{pb}$) in accordance with the present invention.

In reference to FIG. 5A, a diagrammatic depiction of step 410 (i.e., a method for determining the probability of target presence and behavior ($P_{pb}$) is disclosed. For a given cell in the Range-Doppler table 410-1, the amplitude and noise of that cell will be converted to an SNR value 410-10. The SNR value is used to look up the corresponding $P_{pb}$ value 410-30 in the $P_{pb}$ Reference Table 410-2 (stored in a look-up-table in memory). This is done for each cell in the Range-Doppler table, creating a $P_{pb}$ Range Doppler Table ($P_{pb}$ RD Table) 410-3.

In the present invention, step 410 can optionally be followed with the binary determination of the presence of a target based on the $P_{pb}$ calculated a priori (and stored in the LUT), based on a probability threshold (with the detection properties then input into the tracking module 116 (shown in FIG. 3). Because of the unweighted pulse compression step (404) and the probabilistic calculations (408, 410) described herein, substantially all of the signal energy of a reflected pulse may be employed to implement the low loss target detection methodology described herein.

In step 412, a multi-CPI probability of target detection is performed. This may optionally be performed in conjunction with an angle estimation from multiple simultaneous or sequential beams, and may be optionally performed as coherent or non-coherent across CPIs. FIG. 5B is an illustration of a multi-CPI approach for determining the probability of target presence and behavior ($P_{pb}$) in accordance with the present invention. As shown in FIG. 5B, the RSP 100 is configured to process a target probability space (or cube) that includes multiple $P_{pb}$ RD Tables obtained over the same number of coherent processing intervals (CPIs). Step 412 allows RSP 100 to further evaluate Table cells 410-30 that exhibit probabilities ($P_{pb}$) below the set threshold.

In this step, therefore, the $P_{pb}$-RD Table for a common scan sector in step 410 are accumulated from multiple CPIs (in steps 412-414) into a three dimensional matrix (See reference 500, FIG. 5B) for multiple consecutive CPIs, which will be referred to as $P_{pb}$ RD Time Table ($P_{pb}$ RDT Table 500). The probability of the presence of a target may then be recalculated via an accumulation of $P_{pb}$ RD Table values over time, accounting for target range walk or other target kinematic behaviors, and optionally angle space. This is because the target dynamics require a calculation that is not a direct application of common Range-Doppler $P_{pb}$ Table values across the CPIs (except in cases of small Doppler values compared to the time span of the CPIs being processed). In simplest form, the calculation includes factors allowing for target progression in range as associated with Doppler behavior, which will correspond to targets with a near-constant Doppler over the CPIs being processed. In advanced forms, a multiple model or multiple hypothesis model of target behavior can be utilized to provide correlation of undetermined target behaviors across range, Doppler, angle space, coherently or non-coherently, and may include other target characteristics such as Doppler spectra, micro Doppler, high range resolution profiling, and other characteristics well understood by those familiar with the art. The utility of $P_{pb}$ RDT Table for the determination of target presence is included as a part of this invention; the mathematics associated with multiple model or multiple hypothesis target behavior are anticipated to utilize a probabilistic variant of the same mathematical methods used by those already understood by those familiar with the art.

Following the application of tracking functions on the $P_{pb}$ RDT Table, the parameters of the target properties are output for post processing in step 416, which may include additional target tracking, target classification, display, radar energy cueing, or intelligence processing as needed by the radar system.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

As will be appreciated by one skilled in the art, aspects of the present invention may be embodied/implemented as a computer system, method or computer program product. The computer program product can have a computer processor or neural network, for example, which carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto; embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving" "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed:

1. A radar system comprising:
    a RF receiver configured to convert at least one RF signal obtained from an environment into at least one downconverted analog signal having main lobe signal energy and sidelobe signal energy components, the at least one downconverted analog signal corresponding to at least one digital baseband signal; and
    a radar signal processor arrangement including,
        at least one filter coupled to the RF receiver, the at least one filter being configured to correlate the at least one digital baseband signal with a predetermined filter signal, the at least one filter applying substantially no complex weighting to the at least one digital baseband signal to thus provide unweighted signal samples corresponding to the at least one digital baseband signal, the unweighted signal samples substantially retaining signal energy information corresponding to the main lobe signal energy and sidelobe signal energy components,
        a range-Doppler processor element configured to extract frequency data from the unweighted signal samples to obtain range-Doppler data, the range-Doppler processor element being further configured to populate a range-Doppler Table with the range-Doppler data, and
        a target response processor element configured to calculate a target response value for each cell in the range-Doppler Table, each target response value corresponding to a probability of target presence ($P_{pb}$).

2. The system of claim 1, wherein the radar signal processor arrangement is configured as a distributed heterogeneous processing arrangement that includes processing components selected from a group of processing components including application specific integrated circuits (ASICs), field-programmable gate array devices (FPGAs), reduced instruction set computers (RISC), graphics processing units (GPUs), or multi-purpose processor devices.

3. The system of claim 1, wherein the radar signal processor arrangement is configured to convert the at least one downconverted analog signal corresponding to at least one digital baseband signal substantially in accordance with a Nyquist sampling rate.

4. The system of claim 1, further comprising:
    at least one radar display device coupled to the radar signal processor arrangement, the at least one radar display device being configured to represent data corresponding to the probability of target presence ($P_{pb}$) as human-readable indicia; and
    at least one radar control device coupled to the at least one radar display device and the radar system, the at least one radar control device being configured provide control data or radar search parameters to the radar system.

5. The system of claim 1, wherein the target response value is substantially equal to:

$$\text{Response}(a,b) = \sum_{i=1}^{A} \sum_{j=1}^{B} M(i,j) I(i,j,a,b),$$

wherein, M corresponds to the range-Doppler table, A×B corresponds to a size of the range-Doppler table (M), a,b represent an ordered pair corresponding to a location in the range-Doppler table, and I corresponds to an Ideal Response Table.

6. The system of claim 5, wherein the target response value corresponds to a signal-to-noise ratio (SNR), a noise portion of the SNR being based on at least the RF receiver.

7. The system of claim 1, wherein the target response value corresponds to a received signal strength representing the signal energy information, the target response processor being configured to evaluate the target response value over a plurality of cells to determine a multi-cell target response pattern, the plurality of cells corresponding to substantially all or a portion of the range-Doppler table.

8. The system of claim 1, further comprising a target probability processing element configured to arrange the target response values in a Target Response Table having a dimensionality substantially corresponding to the range-Doppler Table.

9. The system of claim 8, wherein each target response value in the Target Response Table is converted into a corresponding probability of target presence ($P_{pb}$) to thus populate a Target Probability Table having a dimensionality substantially corresponding to the Target Response Table.

10. The system of claim 9, further comprising a multi-CPI tracker element configured to compile a plurality of Target Probability Tables over a plurality of coherent processing intervals (CPIs) to form a three-dimensional probability matrix of probability of target presence ($P_{pb}$) values, the three-dimensional probability table having a range axis, a Doppler axis, and a time axis indexed by CPI.

11. The system of claim 10, wherein the multi-CPI tracker is configured to calculate a multi-CPI probability of target presence based on the three-dimensional probability matrix, the multi-CPI probability of target presence being calculated in accordance with a coherent tracker, a non-coherent tracker, a probabilistic multi-model tracker, or a multi-hypothesis tracker.

12. The system of claim 1, wherein the radar signal processor arrangement is further configured to perform a target probability determination, the target probability determination including a converse-Swerling operation, the converse-Swerling operation that converts the target response value into the probability of target presence ($P_{pb}$).

13. The system of claim 12, wherein the target response processor element is configured to covert each cell in the range-Doppler Table into a corresponding target response value to populate a Target Response Table substantially corresponding to the range-Doppler Table.

14. The system of claim 12, wherein the converse-Swerling operation is performed by retrieving the probability of target presence ($P_{pb}$) for each target response value from a look-up table to form a Target Probability Table having a dimensionality substantially corresponding to the range-Doppler Table, the Target Probability Table including probability of target presence ($P_{pb}$) values obtained over one coherent processing interval (CPI).

15. The system of claim 14, further comprising a multi-CPI probability tracker configured to evaluate target probability trends over a plurality of CPIs by evaluating a plurality of Target Probability Tables obtained over a plurality of CPIs.

16. The system of claim 1, wherein the radar system is characterized by an effective search volume, an effective detection range, or an effective update rate that are functions of the signal energy information.

17. A method comprising:
providing a radar system having an RF receiver configured to convert at least one RF signal obtained from an environment into at least one downconverted analog signal having main lobe signal energy and sidelobe signal energy components, the at least one downconverted analog signal corresponding to at least one digital baseband signal;
correlating the at least one digital baseband signal with a predetermined filter signal so that substantially no complex weighting is applied to the at least one digital baseband signal to thus provide unweighted signal samples corresponding to the at least one digital baseband signal, the unweighted signal samples substantially retaining signal energy information corresponding to the main lobe signal energy and sidelobe signal energy components, the radar system being characterized by an effective search volume, an effective detection range, or an effective update rate that are functions of the signal energy information;
extracting frequency data from the unweighted signal samples to obtain range-Doppler data;
populating a range-Doppler Table with the range-Doppler data; and
calculating a target response value for each cell in the range-Doppler Table, each target response value corresponding to a probability of target presence ($P_{pb}$).

18. The method of claim 17, further comprising the step of converting the at least one downconverted analog signal into at least one digital baseband signal in accordance with a Nyquist sampling rate.

19. The method of claim 17, further comprising:
representing data corresponding to the probability of target presence ($P_{pb}$) as human-readable indicia; and
providing control data or radar search parameters to the radar system.

20. The method of claim 17, wherein the target response value is substantially equal to:

$$\text{Response}(a,b)=\Sigma_{i=1}^{A}\Sigma_{j=1}^{B}M(i,j)I(i,j,a,b),$$

wherein, M corresponds to the range-Doppler table, A×B corresponds to a size of the range-Doppler table (M), a,b represent an ordered pair corresponding to a location in the range-Doppler table, and I corresponds to an Ideal Response Table.

21. The method of claim 20, wherein the target response value corresponds to a signal-to-noise ratio (SNR), a noise portion of the SNR being based on at least the RF receiver.

22. The method of claim 17, wherein the target response value corresponds to a received signal strength representing the signal energy information, the target response processor being configured to evaluate the target response value over a plurality of cells to determine a multi-cell target response pattern, the plurality of cells corresponding to substantially all or a portion of the range-Doppler table.

23. The method of claim 17, further comprising the step of arranging the target response values in a Target Response Table having a dimensionality substantially corresponding to the range-Doppler Table.

24. The method of claim 23, wherein each target response value in the Target Response Table is converted into a corresponding probability of target presence ($P_{pb}$) to thus populate a Target Probability Table having a dimensionality substantially corresponding to the Target Response Table.

25. The method of claim 24, further comprising the step of compiling a plurality of Target Probability Tables over a plurality of coherent processing intervals (CPIs) to form a three-dimensional probability matrix of probability of target presence ($P_{pb}$) values, the three-dimensional probability table having a range axis, a Doppler axis, and a time axis indexed by CPI.

26. The method of claim 25, further comprising the step of calculating a multi-CPI probability of target presence based on the three-dimensional probability matrix, the multi-CPI probability of target presence being calculated in accordance with a coherent model, a non-coherent model, a probabilistic multi-model tracker, or a multi-hypothesis tracker.

27. The method of claim 17, further comprising the step of performing a target probability determination, the target probability determination including a converse-Swerling operation, the converse-Swerling operation that converts the target response value into the probability of target presence ($P_{pb}$).

28. The method of claim 27, further comprising the step of converting each cell in the range-Doppler Table into a corresponding target response value to populate a Target Response Table substantially corresponding to the range-Doppler Table.

29. The method of claim 27, wherein the converse-Swerling operation is performed by retrieving the probability of target presence ($P_{pb}$) of the corresponding target response value from a look-up table stored in a memory to form a Target Probability Table having a dimensionality substantially corresponding to the range-Doppler Table, the Target Probability Table including probability of target presence ($P_{pb}$) values for one coherent processing interval (CPI).

30. The method of claim 29, further comprising the step of evaluating target probability trends over a plurality of CPIs by evaluating a plurality of Target Probability Tables obtained over a plurality of CPIs.

* * * * *